United States Patent [19]

Cheng

[11] Patent Number: 5,595,092
[45] Date of Patent: Jan. 21, 1997

[54] POSITIONING DEVICE OF RETRACTABLE BARS OF A TROLLEY

[76] Inventor: Chin-chang Cheng, No. 20, Lane 327, Sec. 2, Chung Shan Rd., Chung Ho City, Taipei Hsien, Taiwan

[21] Appl. No.: 410,341

[22] Filed: Mar. 24, 1995

[51] Int. Cl.[6] .................................. B62B 1/12; G05G 5/22
[52] U.S. Cl. ...................... 74/531; 280/655; 280/47.315; 403/109; 16/115
[58] Field of Search .............................. 74/531; 280/655, 280/655.1, 47.315, 47.371; 403/109, 374; 16/115

[56]  References Cited

U.S. PATENT DOCUMENTS

| 4,076,437 | 2/1978 | Mazzolla ............................. 74/531 X |
| 4,995,487 | 2/1991 | Plath . | |
| 5,335,759 | 8/1994 | Yeh ...................................... 16/115 X |

Primary Examiner—Rodney H. Bonck
Assistant Examiner—Mary Ann Battista
Attorney, Agent, or Firm—Webb Ziesenheim Bruening Logsdon Orkin & Hanson, P.C.

[57] ABSTRACT

A positioning device of a pair of telescopically retractable vertical bars of a trolley includes a sleeve member, a pair of eccentric rings and a control unit. The sleeve member has a pair of sleeves coaxially rigidly mounted on outer tubes of the vertical bars, a plate having a height no less than a height of the sleeves and horizontally extending between the sleeves and tangentially in contact with them at an outer periphery thereof, and a gap respectively and radially defined in the sleeves. The eccentric rings have an inner diameter equal to an outer diameter of inner tubes of the vertical bars for the inner tubes passing therethrough and are coaxially rivetally retained in the gaps with a thinner ring wall thereof in contact with the plate. The control unit is adapted to actuate the eccentric rings to rotate and cause a thicker ring wall thereof to contact the plate and thereby radially displacing the eccentric rings to tighten the inner tubes of the vertical bars to the sleeves and thereby positioning the vertical bars.

5 Claims, 6 Drawing Sheets

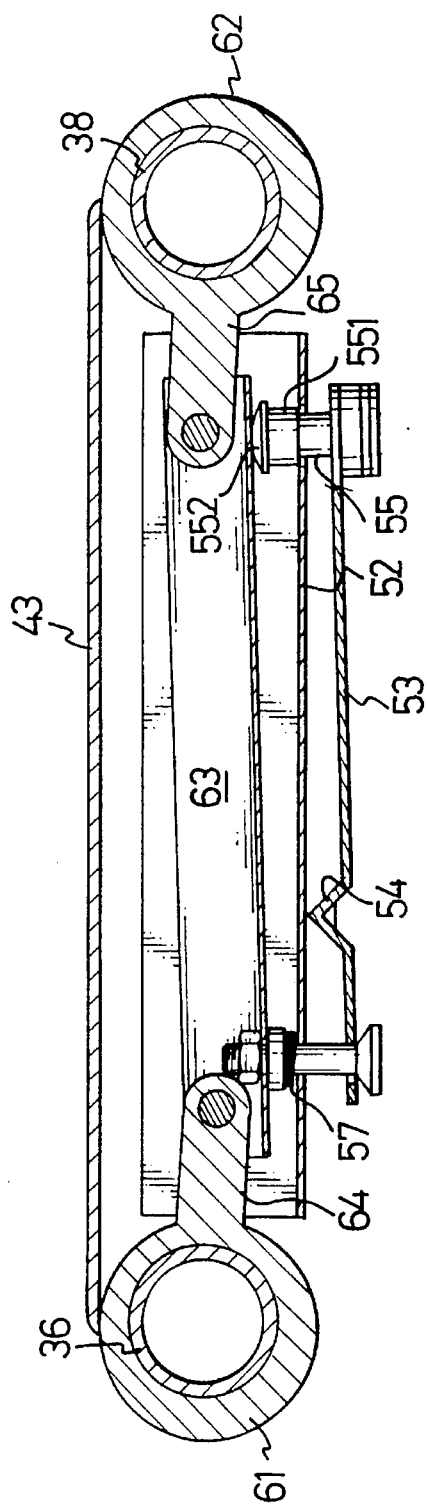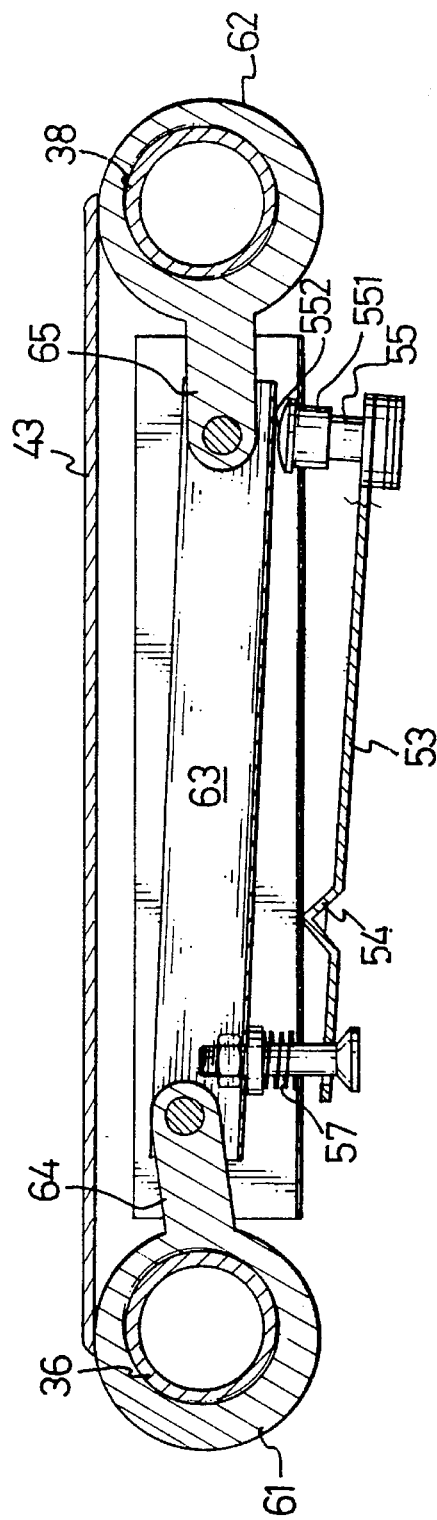

5,595,092

POSITIONING DEVICE OF RETRACTABLE BARS OF A TROLLEY

BACKGROUND OF THE INVENTION

1. Field of the Invention

The present invention relates to a trolley and, more particularly, to a positioning device of telescopically retractable vertical bars of a trolley.

2. Description of Related Art

Retractable trolleys are known to comprise a pair of telescopically retractable vertical bars forming components of a frame, a positioning device for positioning the retractable vertical bars, a handle bar connecting the vertical bars, a supporting seat for carrying baggage and a wheel assembly. A typical structure of conventional positioning devices of the retractable vertical bars comprises a hole defined in a periphery tube wall of an inner tube of the vertical bars, a latch biased by a resilient member which in turn is connected to a control device to operably engage/disengage the latch from the hole to thereby locking/unlocking the vertical bars in position. In order to be used with various heights, a number of holes are usually provided in the periphery wall along an axial direction of the inner tube.

Although more holes provided in the inner tube means more flexible use of the trolley, punching holes in a tube wall is however a destructive design and will eventually weaken the structural strength of the entire trolley. Further, no matter how many holes are provided, it is still a step-adjusting design rather than a continuous smooth positioning design.

The present invention provides an improved positioning device to mitigate and/or obviate the aforementioned problems.

SUMMARY OF THE INVENTION

One object of the present invention is to provide a nondestructive positioning device of telescopically retractable vertical bars of a trolley.

Another object of the present invention is to provide a positioning device of telescopically retractable vertical bars of a trolley that is a continuous and smooth adjusting design.

According to one aspect of the present invention, a positioning device of telescopically retractable vertical bars of a trolley includes a sleeve member comprising a pair of sleeves coaxially rigidly mounted on one end of an outer tube of each of the vertical bars and a plate connecting the sleeves, a pair of eccentric rings having an inner diameter equal to an outer diameter of the inner tubes for the inner tube to pass therethrough and being coaxially aligned with the sleeves, and a pair of control elements respectively coupled to the eccentric rings.

The plate has a height no less than a height of the sleeves and tangentially contacts an outer periphery of the sleeves. Each of the sleeves has a gap radially defined therein. The eccentric rings are rivetally retained in the gaps with a thinner ring wall thereof in contact with the plate. Each of the control elements is radially coupled to a respective eccentric ring at an outer periphery of a thicker ring wall thereof in order to rotate the ring to cause the thicker ring wall to contact the plate and thereby radially displacing the eccentric rings relative to the sleeves and tightening the inner tube the to the sleeves.

According to another aspect of the present invention, a positioning device of telescopically retractable vertical bars of a trolley includes a sleeve member comprising a pair of sleeves coaxially rigidly mounted on one end of an outer tube of each of the vertical bars and a plate connecting the sleeves, a tightening member having a pair of eccentric rings coaxially aligned with the sleeves and a rod pivotally connecting the rings, and a control member having a mounting element mounted to the sleeve member and an actuating unit operably coupled to the mounting element for actuating the tightening member to hold the vertical bars in a desired position.

The plate has a height no less than a height of the sleeves and tangentially contacts an outer periphery of the sleeves. Each of the sleeves has a gap radially defined therein. The eccentric rings have an inner diameter equal to an outer diameter of the inner tubes for the inner tube passing therethrough and are rivetally retained in the gaps of the sleeves with a thinner ring wall thereof contact the plate.

According to a further aspect of the present invention, the actuating unit comprises a lever element having a first end, a second end and a fulcrum structure adjacent to the first end thereof and abutting the mounting element; a rivet coupled to the second end of the lever element and further extending to contact the bar for manually actuating the tightening member; and an elastic element disposed between the rod and the lever element and adjustably coupled thereto to cooperate with the rivet.

Other objects, advantages, and novel features of the invention will become more apparent from the following detailed description when taken in conjunction with the accompanying drawings.

BRIEF DESCRIPTION OF THE DRAWINGS

FIGS. 6 and 7 are top cross-sectional views of the positioning device of FIG. 4 showing the positioning device in a loosened state and a tightened state, respectively.

DETAILED DESCRIPTION OF THE PREFERRED EMBODIMENTS

Figure 1:
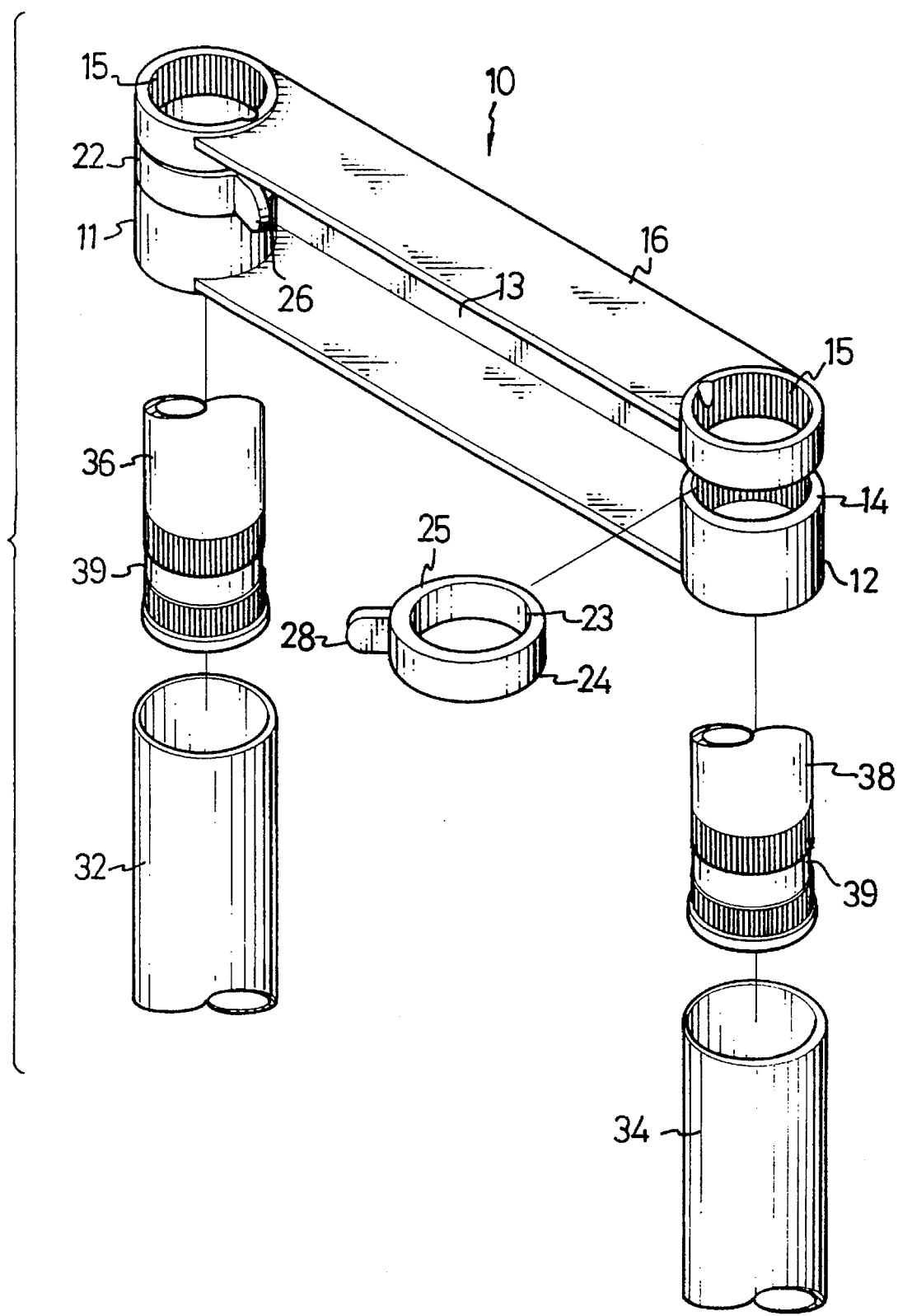
FIG. 1 is a perspective view of a positioning device of telescopically retractable vertical bars of a trolley in accordance with a first embodiment of the present invention.
Figure 2:
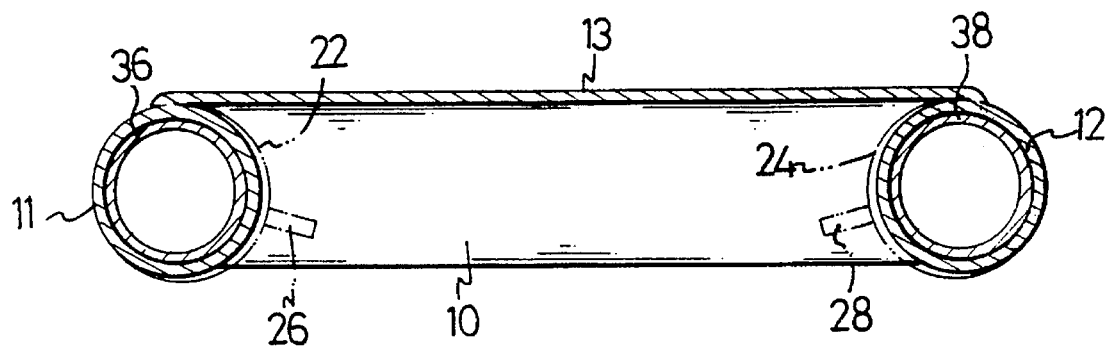
FIGS. 2 and 3 are top cross-sectional views of the positioning device of FIG. 1 showing the eccentric rings in a loosened position and a tightened position, respectively.
Figure 3:
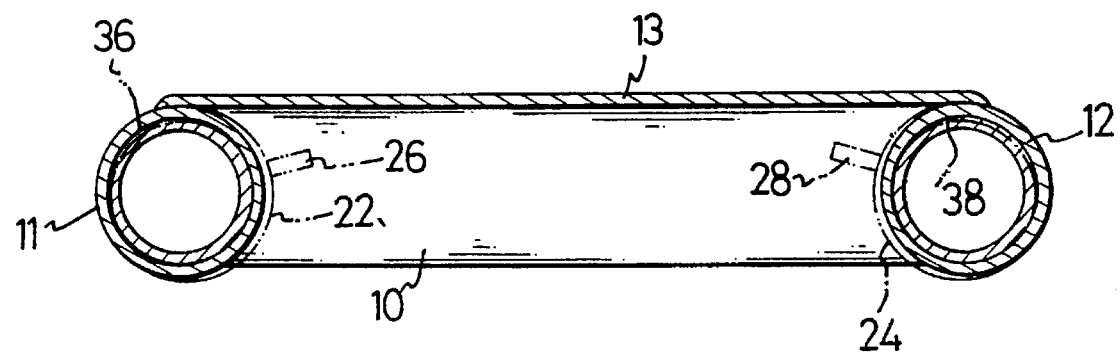
Figure 4:
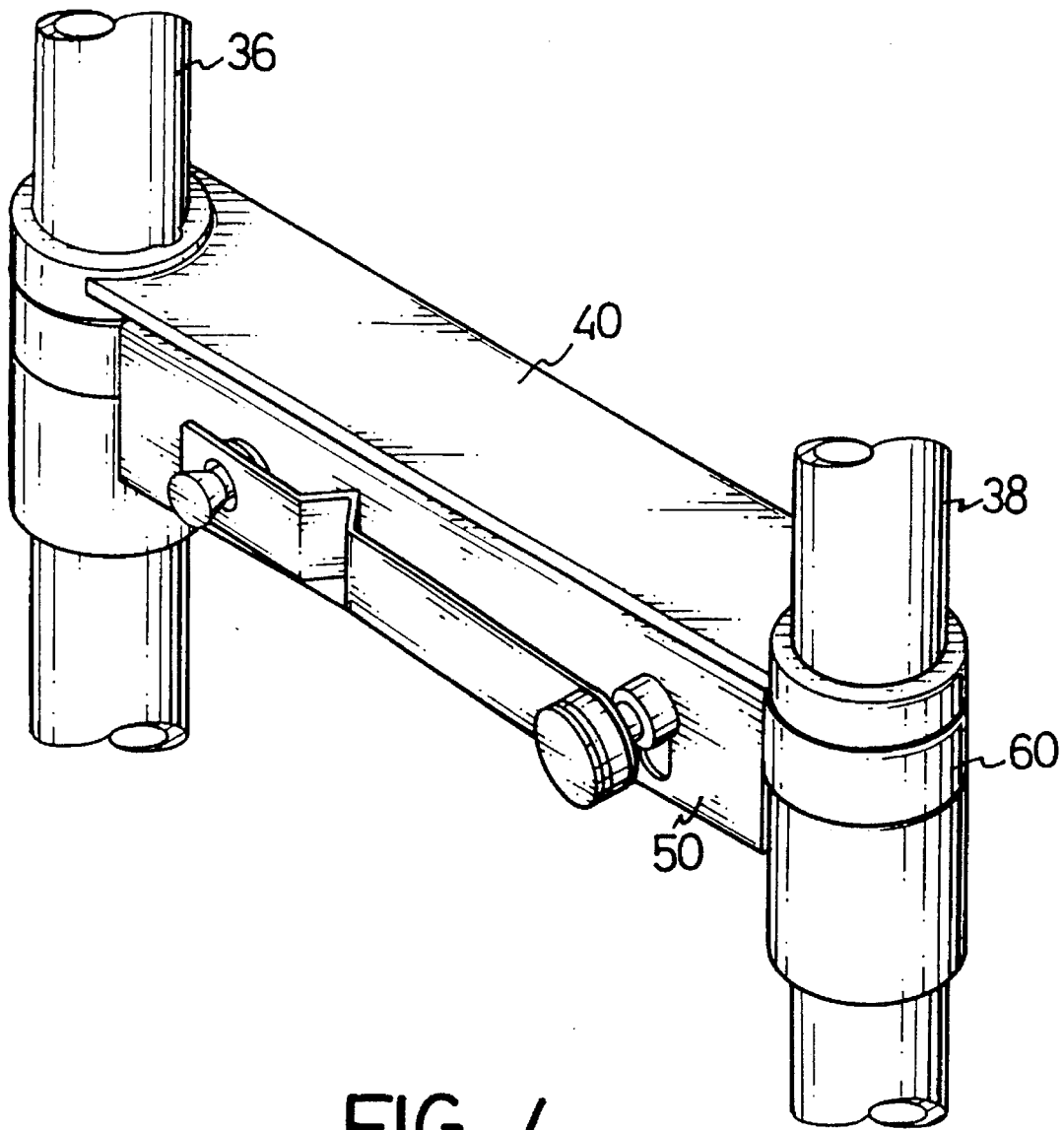
FIG. 4 is a perspective view showing a positioning device of telescopically retractable vertical bars of a trolley in accordance with a second embodiment of the present invention assembled on the vertical bars of a trolley.
Figure 5:
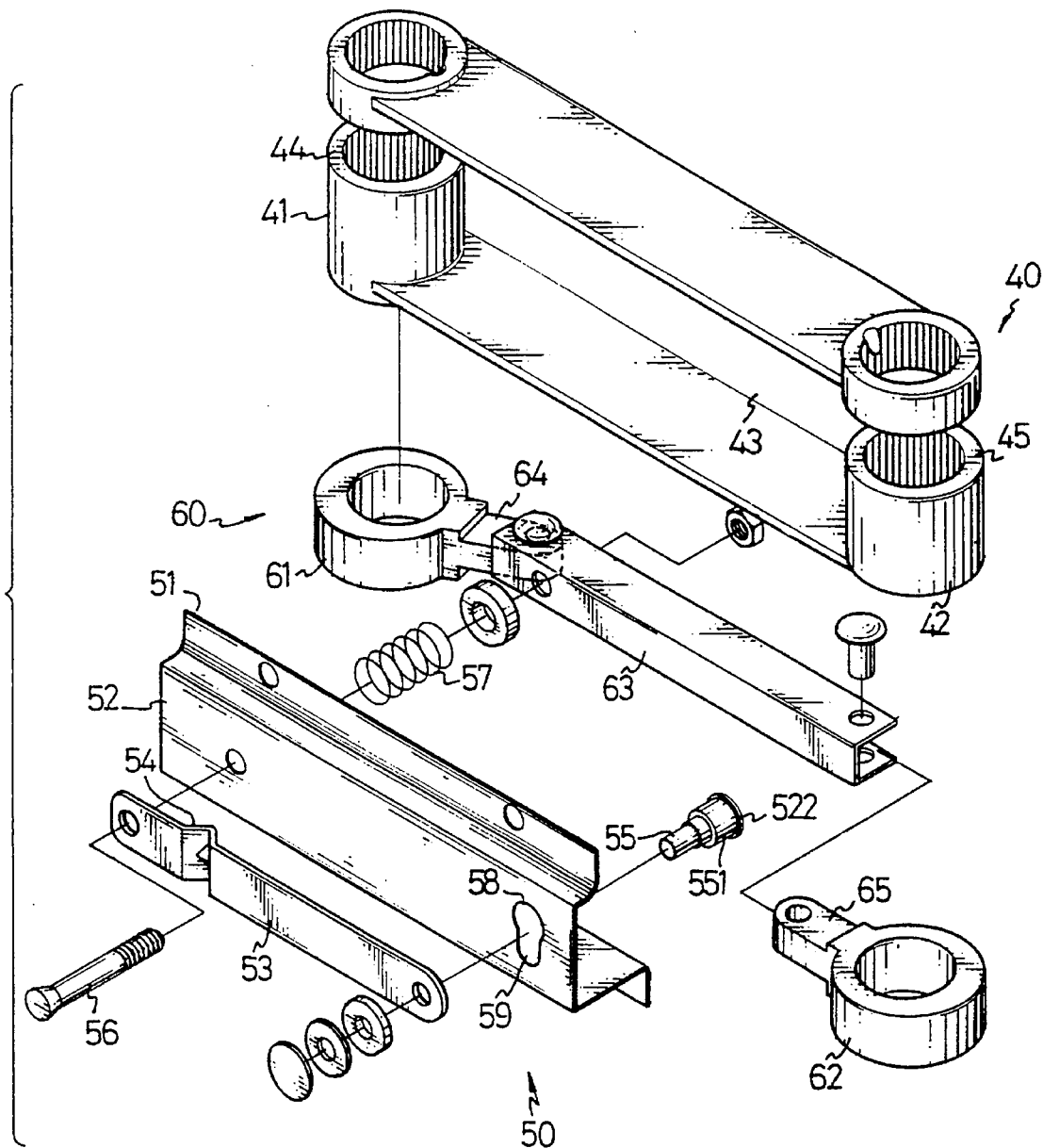
FIG. 5 is an exploded perspective view of the positioning device of FIG. 4.

Referring to FIGS. 1 to 3 and initially to FIG. 1, the positioning device of telescopically retractable vertical bars of a trolley in accordance with a first embodiment of the present invention generally includes a sleeve member 10, a pair of eccentric rings 22, 24 and a pair of control elements 26, 28. The sleeve member 10 comprises a pair of sleeves 11, 12 coaxially rigidly mounted on one end of each of a pair of outer tubes 32, 34 of the vertical bars. The sleeves 11, 12 are connected by a horizontally extending vertical plate 13 tangentially contacting the sleeves 11, 12 at an outer periphery of each and each of the sleeves has a gap 14 radially defined therein. Preferably, a horizontal plate 16 is added between the sleeves 11, 12 to connect them at a top portion thereof to reinforce the connection therebetween.

Both the eccentric rings 22, 24 have an inner diameter equal to an outer diameter of inner tubes 36, 38 of the vertical bars for the inner tube to pass therethrough. The eccentric rings are respectively coaxially disposed in the gaps 14 and arranged such that a thinner ring wall thereof 23 contacts the plate 13. The control elements 26, 28 are protrusions that radially extend from an outer periphery of a thicker ring wall 25 of the eccentric rings 22, 24 respectively.

In use, the eccentric rings 22, 24 are initially in a loosened position, as shown in FIG. 2, with a thinner ring wall thereof 23 in contact with the plate 13. When the inner tubes 36, 38 are extended or retracted to a desired position, the eccentric rings 22, 24 are rotated by the control elements 26, 28 respectively to cause their respective thicker ring wall 25 to contact the plate 13 and the eccentric rings 22, 24 are thereby radially biased to displace and tighten the inner tubes 36, 38 to the sleeves 11, 12 and held thereto, as better shown in FIG. 3. Preferably, an inner surface of respective sleeves 11, 12 has a series of indentations 15 (FIG. 1) to serve as an anti-slip means to increase its friction factor to assist holding the inner tubes in place.

Referring now to FIGS. 4 to 7, a positioning device of telescopically retractable vertical bars of a trolley in accordance with a second embodiment of the present invention generally includes a sleeve member 40, a control member 50 and a tightening member 60. The sleeve member 40 has a structure the same as that of the sleeve member 10 of the first embodiment, thus will not be described again herein.

The tightening member 60 comprises a first eccentric ring 61, a second eccentric ring 62 and a rod 63. The first eccentric ring 61 has a first protrusion 64 radially extending from an outer periphery of a thinner ring wall thereof and the second eccentric ring 62 has a second protrusion 65 radially extending from an outer periphery of a thicker ring wall thereof. The first eccentric ring 61 and the second eccentric ring 62 are pivotally connected to a first end and a second end of a rod 63 respectively. Both the eccentric rings 61, 62 have an inner diameter equal to an outer diameter of the inner tubes for the inner tube passing therethrough. The eccentric rings 61, 62 are respectively coaxially disposed in gaps 44, 45 of sleeves 41, 42 of the sleeve member 40 with an outer periphery thereof in contact with a plate 43 of the sleeve member 40.

The control member 50 comprises a U-shaped mounting plate 51 fixedly coupled to the plate 43 of the sleeve member 40 and receiving the rod 63 in a space defined by the plate 43 and a bottom portion 52 of the U-shaped plate 51; an actuating unit comprising a lever element 53 placed on an outer face of the bottom portion 52 and operably coupled to the bottom portion 52 at a second end thereof by a rivet 55 through a hole 58 defined in the bottom portion 52, a coil spring 57 disposed between the bar 63 and the mounting plate 51 and held in position by a screw 56 extending through a first end of the lever element 54, the mounting plate 51 and then fixed to the rod 63; and a locking element, preferably a vertical slot 59 defined in the bottom portion 52 and in connection with the hole 58.

The rivet 55 has a neck portion, an enlarged portion 551 which is smaller than the hole 58 in diameter and a cap 552 which is larger the hole 58 in diameter. The vertical slot 59 has a width smaller than the diameter of the enlarged portion 551 of the rivet 55. The lever element 53 has a V-shaped impression 54 adjacent to the first end thereof with a tip portion of the V-shaped impression 54 abutting the mounting plate 51 and functioning as a fulcrum.

In use, when the positioning device is in a loosened position, as shown in FIG. 6, the second end of the rod 63 is biased by the spring 57 and causes the second end of the rod 63 pushing the rivet 55 passing through the hole 58. In this state, both the eccentric rings 61, 62 contact the plate 43 with a thinner ring wall thereof and the inner tubes of the vertical bars are free to be telescopically moved.

Figure 8:
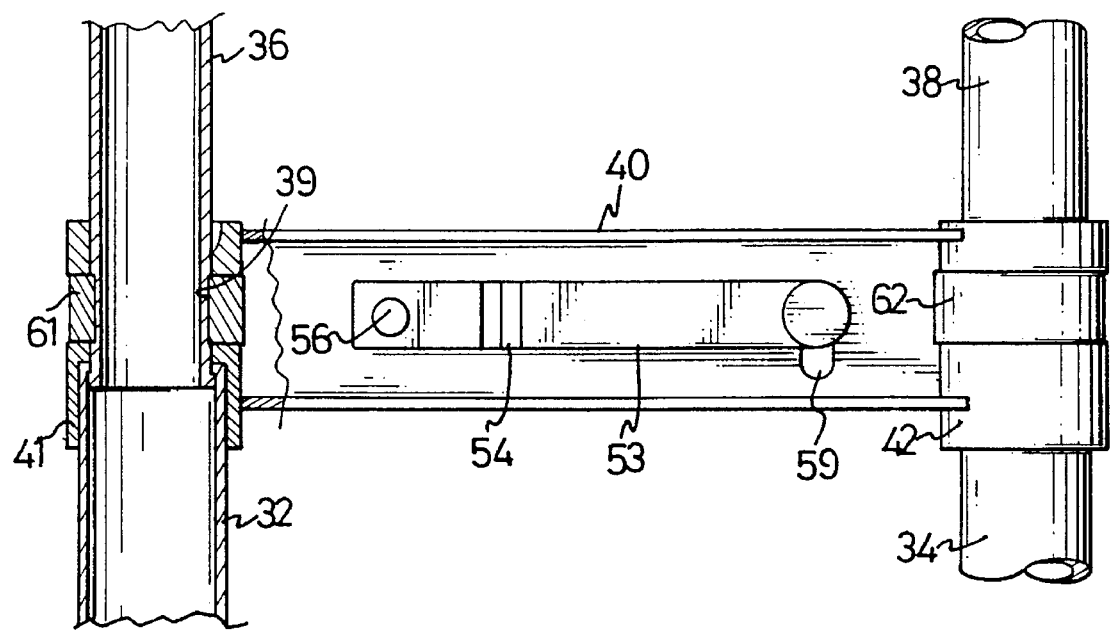
FIG. 8 is a front view of the positioning device according to another embodiment of the present invention with a portion indicated in section to show the internal structure.

Referring now to FIG. 7, after the inner tubes 36, 38 are moved to a desired position, the rivet 55 is then pushed down to drive the second end of the rod 63 to move downwardly and the first end of the rod 63 is moved upwardly to compress 13 the spring 57 and both the eccentric rings 61, 62 are thereby caused to pivot clockwise and a thicker wall of each eccentric ring is forced to contact the plate 43. Thus, the eccentric rings 61, 62 are forced to displace radially and the inner tubes are thereby tightened to the sleeves 41, 42 and held in position. To maintain the positioning device in this tightened state, the rivet 55 is then slid into the slot 59 and locked therein because the enlarged portion 551 of the rivet 55 is stopped by the wall of the slot 59. As the rivet 55 is slid back to the hole 58, it is lifted up to pass the hole 58 by the second end of the rod 63 because the first end of the rod 63 is pushed down by the compressed spring 57 and thereby release the tightened state. According to another embodiment of the present invention, as shown in FIG. 8, each of the inner tubes 36, 38 has a circular recess 39 defined in one end thereof with a width no less than the height of the eccentric rings 61, 62 such that as the inner tubes 36, 38 are fully extended the eccentric rings 61, 62 can engage the recesses 39 to lock the inner tubes in position when the eccentric rings 61, 62 are actuated.

Although the invention has been explained in relation to its preferred embodiment, it is to be understood that many other possible modifications and variations can be made without departing from the spirit and scope of the invention as hereinafter claimed.

I claim:

1. A positioning device of a pair of telescopically retractable vertical bars of a trolley, wherein each of said retractable bars has an outer tube and an inner tube telescopically received in the outer tube, the positioning device comprising:

a sleeve member comprising a pair of sleeves coaxially rigidly mounted on one end of the outer tubes, the sleeves being connected by a horizontally extending plate tangentially in contact with an outer periphery of the sleeves and each of the sleeves having a gap radially defined therein; and a pair of eccentric rings having an inner diameter equal to an outer diameter of the inner tubes with the inner tubes passing therethrough and coaxially rivetally retained in the gaps with a thinner ring wall thereof in contact with the plate, each of the rings having a protrusion laterally extending from an outer periphery of a thicker ring wall thereof for rotating the ring to cause the thicker ring wall to contact the plate and thereby laterally displacing the ring and tightening the inner tube to the outer tube.

2. The positioning device as claimed in claim 1 wherein each of the sleeves has an anti-slip means disposed on an inner surface thereof.

3. A positioning device of a pair of telescopically of said retractable vertical bars of a trolley, wherein each of said retractable bars has an outer tube and an inner tube telescopically received in the outer tube, the positioning device comprising:

a sleeve member comprising a pair of sleeves coaxially permanently mounted on one end of the outer tubes, the sleeves being connected by a horizontally extending plate tangentially in contact with an outer periphery of the sleeves and each of the sleeves having a gap radially defined therein;

a control member having a mounting element coupled to the sleeve member, an actuating unit operably coupled to the mounting element and a locking element; and a tightening member having a first eccentric ring pivotally connected to a first end of a rod and a second eccentric ring pivotally connected to a second end of the rod, both the eccentric rings having an inner diameter equal to an outer diameter of the inner tubes with the inner tubes passing therethrough, each of the eccentric rings being respectively coaxially disposed in the gaps with a thinner ring wall thereof in contact with the plate, the tightening member being arranged such that as the rod is actuated by the actuating unit a thicker ring wall of the eccentric rings is caused to contact the plate and thereby radially displace the rings to tighten the inner tubes to the sleeves.

4. The positioning device as claimed in claim 3 wherein the actuating unit comprises:

a lever element having a first end, a second end and a fulcrum structure adjacent to the first end thereof against the mounting element;

a rivet coupled to the second end of the lever element and the mounting element and further extending to contact the second end of the rod for manually actuating the tightening member; and an elastic element disposed between the first ends of both the rod and the lever element and adjustably coupled thereto to cooperate with the rivet.

5. The positioning device as claimed in claim 3 wherein each of the sleeves has an anti-slip means disposed on an inner surface thereof.

* * * * *